(12) United States Patent
Yasuhara et al.

(10) Patent No.: US 8,746,774 B2
(45) Date of Patent: Jun. 10, 2014

(54) MOTORCYCLE POSITION LAMP ARRANGEMENT

(75) Inventors: Hidefumi Yasuhara, Kobe (JP); Daisuke Watanabe, Akashi (JP); Shinji Ikeda, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 184 days.

(21) Appl. No.: 13/160,379

(22) Filed: Jun. 14, 2011

(65) Prior Publication Data

US 2011/0317441 A1 Dec. 29, 2011

(30) Foreign Application Priority Data

Jun. 28, 2010 (JP) ................. 2010-145941

(51) Int. Cl.
 *B62J 17/00* (2006.01)
(52) U.S. Cl.
 USPC ........................................ 296/78.1
(58) Field of Classification Search
 USPC ........ 296/78.1, 180.1, 180.2, 180.3; 244/130; 340/432, 464, 465, 467, 468, 475, 479; 362/473, 475, 507, 540, 474, 476; 315/82
 See application file for complete search history.

(56) References Cited

U.S. PATENT DOCUMENTS

| | | | | |
|---|---|---|---|---|
| 4,019,774 A * | 4/1977 | Tsukahara et al. | ........... | 296/78.1 |
| 4,087,110 A * | 5/1978 | Vetter | ........... | 296/78.1 |
| 4,320,906 A * | 3/1982 | Saunders, IV | ........... | 362/474 |
| 4,355,838 A * | 10/1982 | Hickman | ........... | 296/78.1 |
| 4,356,536 A * | 10/1982 | Funabashi et al. | ........... | 362/476 |
| 4,461,508 A * | 7/1984 | Ogishima | ........... | 296/78.1 |
| 4,515,405 A * | 5/1985 | Ogishima | ........... | 296/78.1 |
| 4,678,223 A * | 7/1987 | Kishi et al. | ........... | 296/78.1 |
| 4,770,460 A * | 9/1988 | Miura et al. | ........... | 296/78.1 |
| 4,964,484 A * | 10/1990 | Buell | ........... | 180/219 |
| 5,330,029 A * | 7/1994 | Yoshimura et al. | ........... | 180/219 |
| 5,409,287 A | 4/1995 | Suzuki | | |
| 6,120,083 A * | 9/2000 | Gunther | ........... | 296/78.1 |
| 6,435,155 B2 * | 8/2002 | Kawamoto | ........... | 123/196 A |
| 7,080,929 B2 * | 7/2006 | Uemoto et al. | ........... | 362/475 |
| 7,137,722 B2 * | 11/2006 | Uemoto et al. | ........... | 362/473 |

(Continued)

FOREIGN PATENT DOCUMENTS

| | | |
|---|---|---|
| CN | 1814496 | 8/2006 |
| CN | 201220712 | 4/2009 |

(Continued)

OTHER PUBLICATIONS

European Application No. 11004953.3 Communication Pursuant to Article 94(3) EPC dated Sep. 12, 2012, 5 pages.

(Continued)

*Primary Examiner* — Kiran B Patel (57) ABSTRACT

A fairing (17) for covering a front portion of a motorcycle is formed with an air intake opening (30) through which an intake air (A) is introduced towards a motorcycle combustion engine (E), and a front face (73) of a covering (72), which is a light emitting surface for a position lamp (40), is arranged above an inner peripheral face (31) of the air intake opening (30). The front face (73) of the covering (72) is downwardly inclined from front towards rear when viewed from side and projects forwards towards a point intermediate of the width of the motorcycle when viewed front.

16 Claims, 7 Drawing Sheets

(56) References Cited

U.S. PATENT DOCUMENTS

| | | | |
|---|---|---|---|
| 7,270,207 B2* | 9/2007 | Idei et al. | 180/68.3 |
| 7,339,461 B2* | 3/2008 | Orita et al. | 340/442 |
| 7,370,902 B2* | 5/2008 | Seki et al. | 296/78.1 |
| 7,399,029 B2 | 7/2008 | Takeshita | |
| 7,448,461 B2 | 11/2008 | Misaki et al. | |
| 7,628,517 B2* | 12/2009 | Domoto et al. | 362/475 |
| 7,651,251 B2* | 1/2010 | Matsumura et al. | 362/494 |
| 7,812,559 B2* | 10/2010 | Tsuda | 318/468 |
| 7,950,367 B2* | 5/2011 | Yoshizawa | 123/399 |
| 8,035,305 B2* | 10/2011 | Buell et al. | 315/83 |
| 8,267,460 B2* | 9/2012 | Kurihara | 296/78.1 |
| 2003/0221891 A1* | 12/2003 | Fecteau et al. | 180/210 |
| 2005/0267674 A1* | 12/2005 | Suzuki et al. | 701/200 |
| 2006/0069499 A1* | 3/2006 | Suzuki et al. | 701/200 |
| 2006/0219450 A1 | 10/2006 | Misaki et al. | |
| 2007/0024089 A1 | 2/2007 | Takeshita | |
| 2007/0086203 A1* | 4/2007 | Nakano et al. | 362/514 |
| 2008/0238018 A1* | 10/2008 | Yoshizawa | 280/166 |
| 2009/0057046 A1* | 3/2009 | Kofuji | 180/226 |
| 2010/0012418 A1* | 1/2010 | Yoshizawa | 180/312 |
| 2010/0141001 A1* | 6/2010 | Matano et al. | 297/284.8 |
| 2011/0051443 A1* | 3/2011 | Nishijima et al. | 362/475 |
| 2011/0315099 A1* | 12/2011 | Uchiyama | 123/54.4 |
| 2012/0061989 A1* | 3/2012 | Yasuhara et al. | 296/78.1 |
| 2012/0145135 A1* | 6/2012 | Mashita | 123/572 |
| 2012/0325571 A1* | 12/2012 | Nomura et al. | 180/220 |

FOREIGN PATENT DOCUMENTS

| | | |
|---|---|---|
| DE | 10 2006 014 584 | 10/2006 |
| EP | 1 688 342 | 8/2006 |
| EP | 1 905 682 | 4/2008 |
| EP | 2 042 415 | 4/2009 |
| JP | 62-116371 | 5/1987 |
| JP | 64-393 | 1/1989 |
| JP | 07-117748 | 5/1995 |
| JP | 07-156848 | 6/1995 |
| JP | 2001-088758 | 4/2001 |

OTHER PUBLICATIONS

Chinese Application No. 201110172445.4 Office Action dated Jan. 30, 2013, 10 pages with partial English translation.

European Application No. 11004953.3 Extended European Search Report dated Sep. 12, 2011, 6 pages.

Japanese Application No. 2010-145941 Office Action dated Feb. 12, 2014, 4 pages including partial English translation.

* cited by examiner

MOTORCYCLE POSITION LAMP ARRANGEMENT

CROSS REFERENCE TO THE RELATED APPLICATION

This application is based on and claims Convention priority to Japanese patent application No. 2010-145941, filed Jun. 28, 2010, the entire disclosure of which is herein incorporated by reference as a part of this application.

BACKGROUND OF THE INVENTION

1. Field of the Invention

The present invention relates to an arrangement of a vehicle lamp such as, for example, a position lamp used in a motorcycle.

2. Description of Related Art

For example, the motorcycle is generally equipped with a position lamp for providing an indication of the position of such motorcycle to other vehicles and pedestrians. See, for example, the JP Laid-open Patent Publication No. 2001-88758, published Apr. 3, 2001. The position lamp is required to have a definite range of illumination and a definite amount of light distribution. According to the previously mentioned patent publication, the position lamp of a configuration elongated in a leftward and rightward direction, that is, in a direction widthwise of the motorcycle is arranged at a portion of a motorcycle front portion intermediate of the leftwards and rightwards direction, that is, intermediate of the width of the motorcycle to secure the required range of illumination and the required amount of light distribution.

On the other hand, the position lamp is often required to have such an appearance that does not make the presence of the position lamp to be conspicuous. According to the previously mentioned patent publication, although the sufficient amount of light distribution can be secured, the presence of the position lamp is too conspicuous. However, to make the position lamp to be small in size so as to suppress the conspicuousness makes it difficult to secure the required amount of light distribution.

SUMMARY OF THE INVENTION

In view of the foregoing, the present invention has been devised to provide a lamp arrangement for a vehicle, the presence of which is made less conspicuous while the required range of illumination and the required amount of light distribution are secured.

In order to accomplish the foregoing object, the present invention provides a lamp arrangement in a vehicle such as a motorcycle, which includes a fairing for covering a front portion of the motorcycle, the fairing being formed with an opening which is depressed rearwardly from a fairing surface to open forwards, and a lamp mounted on the fairing with its light emitting surface arranged in an inner peripheral surface of the opening.

According to the above construction, since light from the outside will hardly reach the inner peripheral face of the opening, it is possible to prevent the existent of the lamp from becoming conspicuous when and so long as the lamp is turned off. As a result, the appearance of the motorcycle improves. In addition, since the opening is opened forwards, the required range of forward illumination and the required amount of light distribution can be secured when the lamp is turned on. In this way, the visibility of the lamp improves.

For the opening referred to above, an opening continues to an air intake opening for introducing an air therethrough towards a motorcycle combustion engine can be employed. This permits the air intake opening to be used as the opening and therefore, there is no need to employ any extra opening.

The light emitting surface referred to above preferably has a front face inclined from front to rear so as to converge at a center of the opening. When the front face of the light emitting surface is so inclined, the conspicuousness of the light emitting surface when viewed from front is suppressed and in addition, the surface area of the light emitting surface is increased, thereby securing the required amount of light distribution and increasing the visibility of the lamp. Also, where the air intake opening is used for the opening referred to above, the inclination of the front face functions as a guide for guiding the air towards the air intake opening.

In a preferred embodiment of the present invention, the light emitting surface may be arranged in an upper region of the inner peripheral surface of the opening. The upper region of the inner peripheral surface of the opening is a site where the light from the outside will hardly reach from above as compared with a lower region of the inner peripheral surface of the opening and, therefore, it is possible to render the existence of the lamp, when the latter is turned off, to be less conspicuous. Also, as compared with the case in which the lamp is arranged in the lower region of the inner peripheral surface of the opening, the lamp can be lightened at a high position and therefore the visibility of the lamp increases when and so long as the lamp is turned on.

Where the light emitting surface is arranged in the inner peripheral surface of the opening, the opening preferably has an upper wall and opposite side walls, the upper wall having a protuberance protruding forwards beyond front ends of opposite side walls of the opening, in which case the light emitting surface is arranged in a lower face of this protuberance. This structural feature is particularly advantageous in that since the lamp is arranged in the protuberance protruding forwards from the opposite side walls of the opening, light from the lamp, when the latter is turned on, will not be intercepted by the opposite side walls and therefore, the amount of light distribution towards opposite sides of the motorcycle can be increased. As a result, the visibility of the lamp from opposite sides increases.

Where the light emitting surface is arranged in the upper region of the inner peripheral surface of the opening, the light emitting surface preferably has a front face inclined towards a point intermediate of a widthwise direction of the motorcycle so as to protrude forwards. This advantageously allows the light from the front face of the light emitting surface to be projected not only in the forward direction, but also in leftward and rightward directions of the motorcycle and, therefore, the visibility of the lamp from opposite sides increases.

In another preferred embodiment of the present invention, the light emitting surface may have a front face and an extension face continued from a rear side of the front face. In this case, not only the front face of the light emitting surface, but also the extension face continued from the rear side of the front face forms a light emitting surface so that light can be emitted also from the extension face and, accordingly, the light is reflected by a face other than the light emitting surface in the inner peripheral surface of the opening and the reflecting surface therefore forms a part of the light emitting region, thus increasing the light emitting region. Accordingly, the visibility of the lamp further increases.

In a further preferred embodiment of the present invention, the lamp arrangement may include a cowl member, forming a part of the fairing, and a center ram member disposed rearwardly of the fairing to form a part of an air induction passage, with the light emitting surface arranged between the fairing and the center ram member.

If the cowl member and the center ram member are of a unitary structure, the necessity may arise that the lamp must be arranged in a narrow space within the opening in the cowl member. However, the use of the cowl member and the center ram member which are members separate from each other is effective in that the cowl member and the center ram member are separated from each other and the lamp can be fixed to one or both of the cowl member and the center ram member at a large working space, thus increasing the assemblability of the lamp.

Where the light emitting surface is arranged between the cowl member and the center ram member, the fairing and the center ram member preferably have outer surfaces colored in respective colors different from each other. Since the cowl member and the center ram member are made of members separate from each other, the cowl member and the center ram member can be easily formed in different colors by, for example, using coloring materials of different colors or painting with different colors. By carefully coloring each of those members, it is possible to suppress the conspicuousness of the lamp without affecting the appearance of the vehicle.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
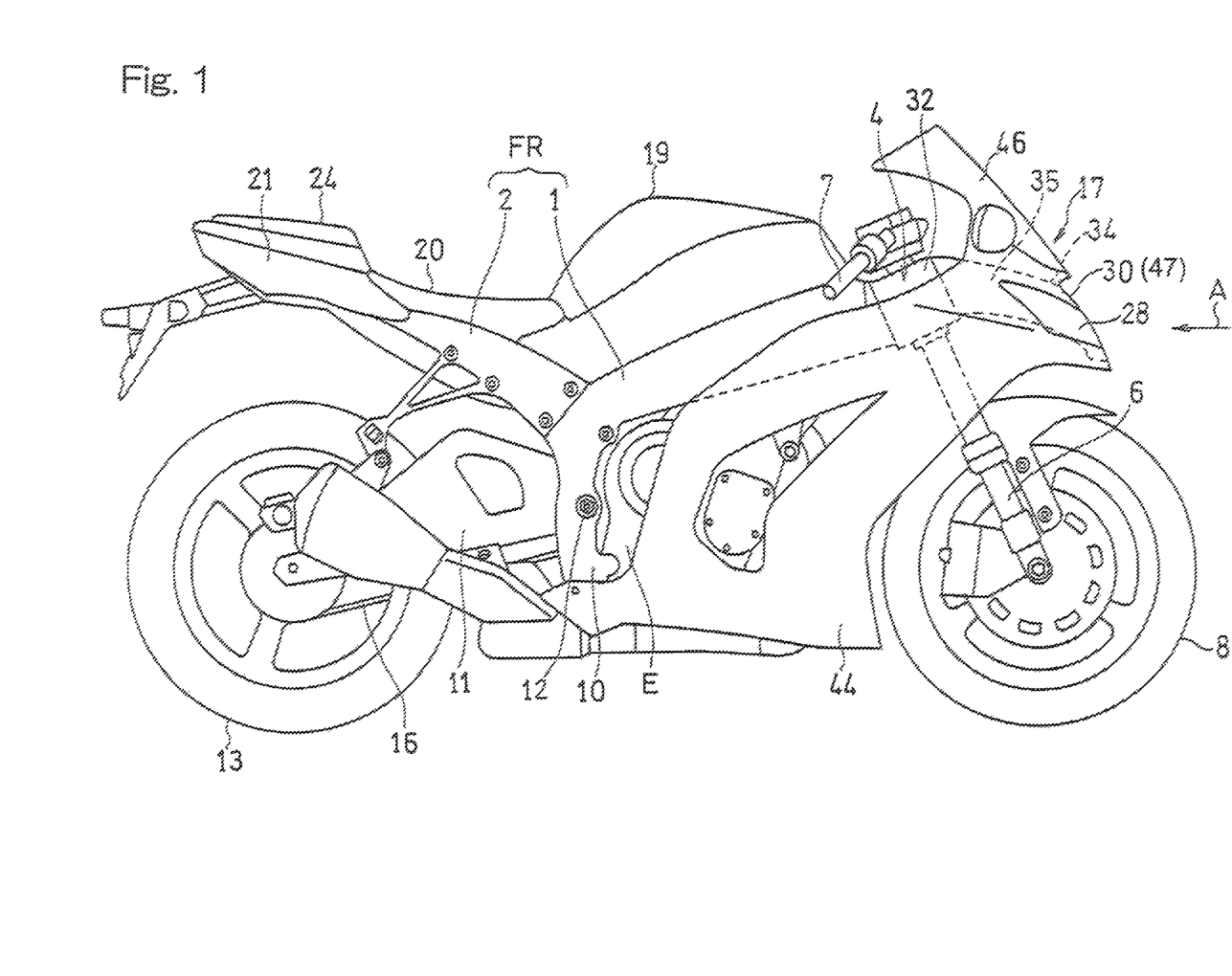
FIG. 1 is a side view of a motorcycle equipped with a lamp arrangement designed according to a preferred embodiment of the present invention.

Hereinafter, a preferred embodiment of the present invention will be described in detail with reference to the accompanying drawings. In particular, FIG. 1 illustrates a side view of a motorcycle, which is one of vehicles equipped with a lamp arrangement according to the preferred embodiment of the present invention. The illustrated motorcycle includes a motorcycle frame structure FR made up of a main frame 1, forming a front half of the motorcycle frame structure FR, and a rear frame 2 coupled with a rear portion of the main frame 1 and forming a rear half of the motorcycle frame structure FR. A front fork assembly 6 is pivotally supported by a steering shaft (not shown) which is rotatably supported by a head block 4 at a front end of the main frame 1, and a front wheel 8 is rotatably fitted to a lower end of the front fork assembly 6. A steering handlebar 7 is mounted on an upper end of the front fork assembly 6 for pivotal movement together therewith.

A rear end portion of the main frame 1, which is located at a lower intermediate portion of the motorcycle frame structure FR, has a swingarm bracket 10 connected therewith and a swingarm 11 has its front end portion pivotally connected to the swingarm bracket 10 through a pivot shaft 12 for movement up and down about such pivot shaft 12. A rear drive wheel 13 is rotatably supported by a rear end portion of the swing arm 11.

A motorcycle combustion engine E is mounted on a generally intermediate lower portion of the motorcycle frame structure FR at a portion forwardly of the swingarm bracket 10 and the rear drive wheel 13 referred to above is driven by this combustion engine E through a drive chain or belt 16. For the combustion engine E referred to above, a four cylinder, four-stroke cycle combustion engine, for example, may be employed.

A fuel tank 19 is mounted on an upper portion of the main frame substructure 1 and a rider's seat 20 and a tail covering 21 are mounted on a portion of the rear frame substructure 2 rearwardly of the fuel tank 19. A fellow passenger's seat 24 is supported by the rear frame substructure 2 so as to overhang the tail covering 21.

A fairing 17 made of a synthetic resin is mounted on a front portion of the motorcycle so as to extend from an upper end portion of the front fork assembly 6 to opposite side portions of and a lower portion of the combustion engine E. This fairing 17 has left and right headlamp units 28 and 28 mounted thereon and also has an air inflow opening 47 defined therein at a location intermediate between the left and right headlamp units 28 and 28, and the air inflow opening 47 is communicated with an air inlet 30 for allowing the incoming air to be introduced therethrough towards the combustion engine E for use in combustion with fuel within the combustion engine E.

The head block 4 referred to previously is in the form of a cast product of one piece construction including an intake duct 32, having a front end opening, and a head tube (not shown), through which the steering shaft extends. A front end of the intake duct 32 is connected with a ram duct unit 34, which is in turn is connected with the fairing 17 with a front end opening of the intake duct 32 positioned within the air inlet 30 in the fairing 17. The air inlet 30, the ram duct unit 34 and the intake duct 32 altogether constitute a part of an air induction passage 35 through which an air is introduced into the combustion engine E for use in combustion with fuel within the combustion engine E.

Figure 2:
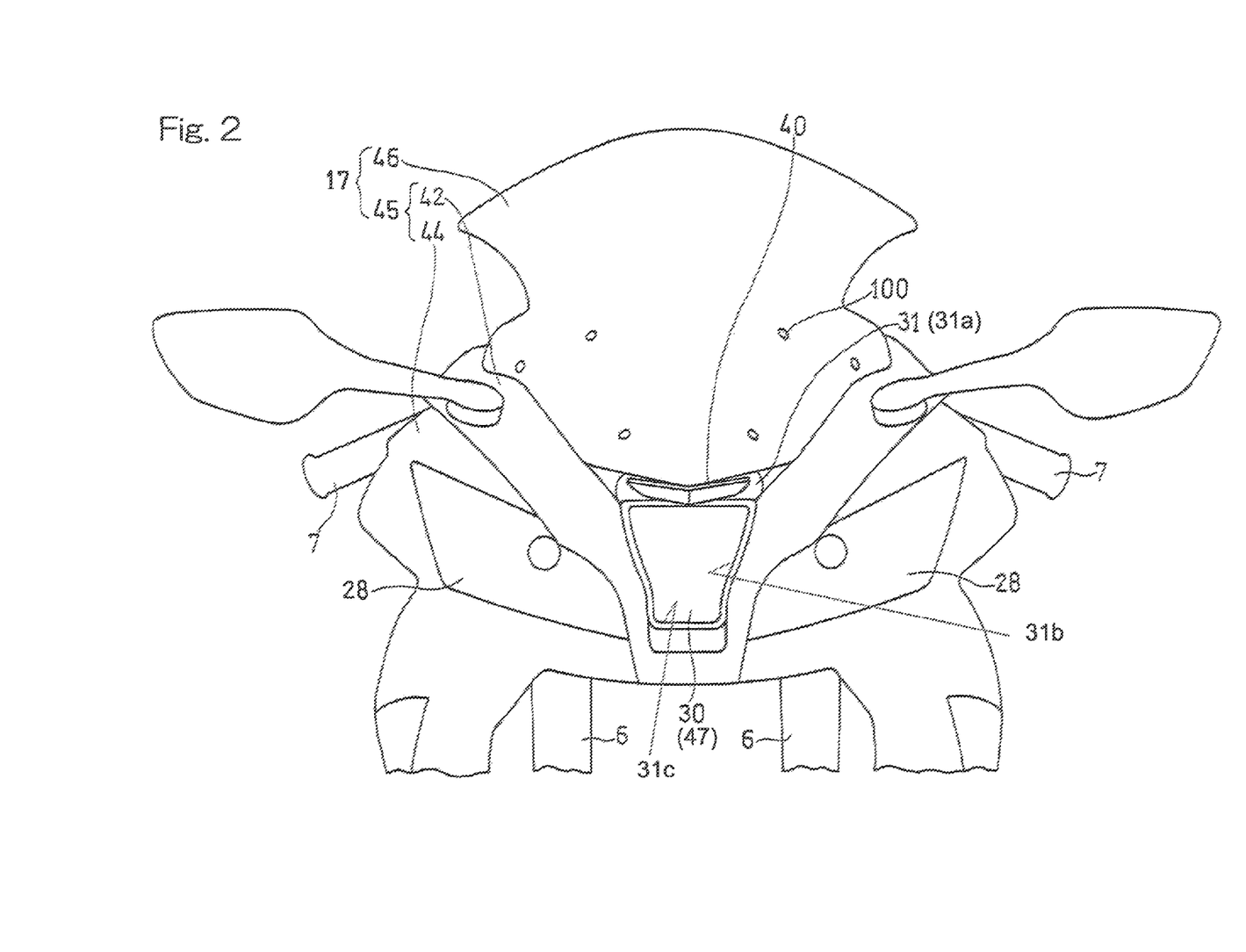
FIG. 2 is a fragmentary front elevational view showing the motorcycle on an enlarged scale.

As best shown in FIG. 2, a position lamp 40 for providing an indication of the presence of the motorcycle is arranged in an inner peripheral surface 31 of the air inlet 30 at an upper region 31a of the inner peripheral surface 31. In the instance as shown, the position lamp 40 is so arranged with its light emitting surface exposed from the upper region 31a of the inner peripheral surface 31, but other than the upper region 31a of the inner peripheral surface 31 the light emitting surface may be arranged with its light emitting surface exposed from a lower or side region 31c or 31b thereof. Alternatively, it may be arranged at a plurality of locations such as an upper region 31a or a side region 31b. If the position lamp 40 is arranged on the upper region 31a or side region 31b, water would hardly ingress into the position lamp 40 as compared with the case in which it is arranged on the lower region 31c.

The fairing 17 is made up of a front fairing panel 42 positioned at a center portion of the motorcycle in a widthwise direction and forming a part of the air inlet 30, left and right side fairing panels 44 positioned generally laterally rearwardly of the front fairing panel 42 so as to extend around left and right side portions of the motorcycle, and a transparent windshield 46 for protecting the rider from the incoming wind. The front fairing panel 42 and the side fairing panels 44 altogether form a cowl member 45. On the other hand, the transparent windshield 46 is secured to the front fairing panel 42 of the cowl member 45 by means of screw members 100. The position lamp 40 is supported by the front fairing panel 42 in a manner which will be described in detail later.

Figure 3:
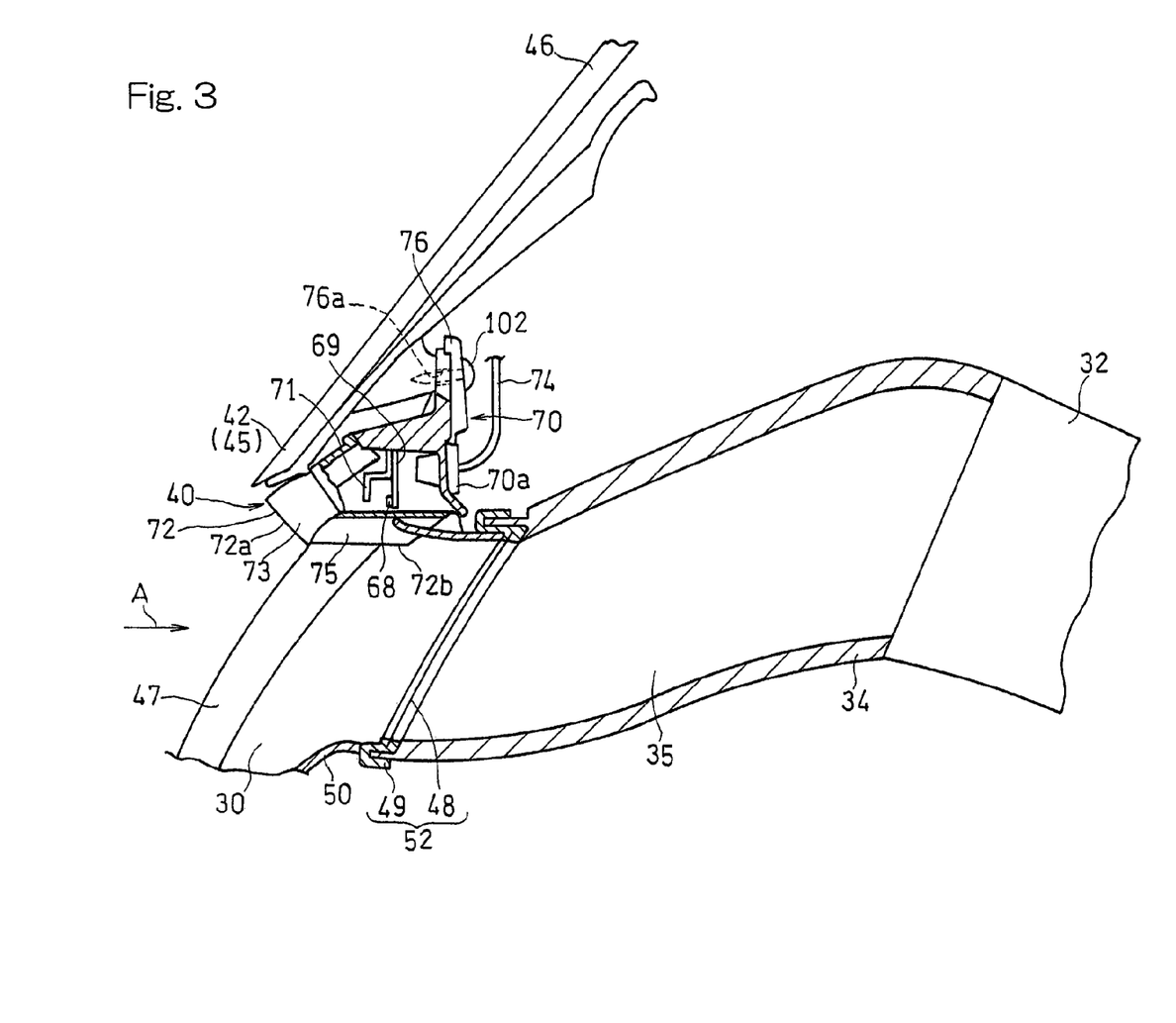
FIG. 3 is a fragmentary longitudinal sectional view showing a front portion of the motorcycle shown in FIG. 1.

As best shown in FIG. 3, the front fairing panel 42 of the cowling member 45 has a portion covering the front intermediate of the motorcycle and forming a front half of the air inlet 30, and a center ram member 50 is disposed rearwardly of that portion. The air inlet 30 for the introduction therethrough of the incoming wind A into the air passage 35 is formed so as to extend over the front fairing panel 42 and the center ram member 50. The center ram member 50 has a rear end connected with the ram duct unit 34 through a screen unit 52 accommodating therein a mesh-like screen 48 through a screen support frame 49.

Figure 4A:
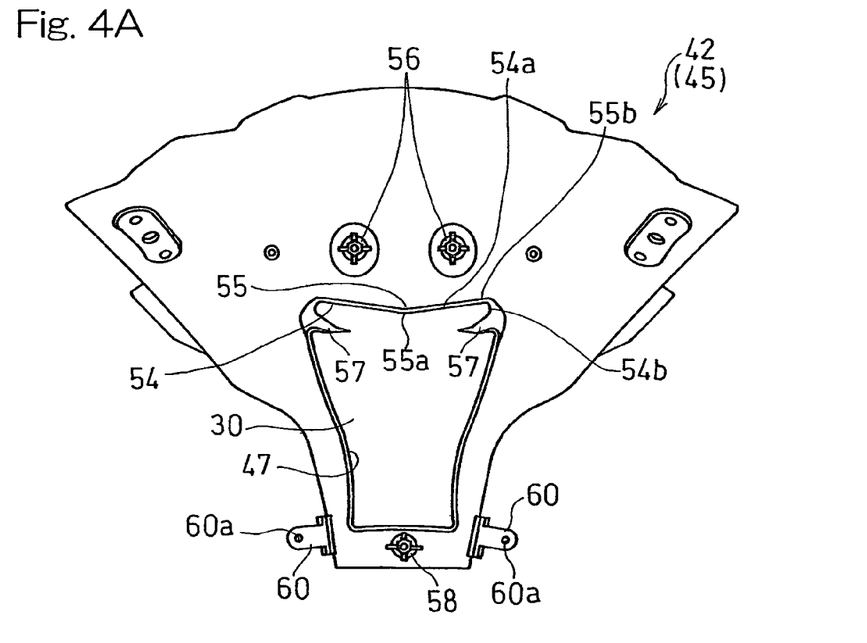
FIG. 4A is a rear view showing a fairing employed in the motorcycle shown in FIG. 1.

As shown in FIG. 4A, the front fairing panel 42 is of a generally sector shape and has the air inflow opening 47 defined in a portion thereof intermediate of the width of the sector shaped front fairing panel 42 so as to extend from an intermediate portion down to a lower portion in a direction vertically of the front fairing panel 42. This air inflow opening 47 forms the front half of the air inlet 30. A lamp opening 54 is formed in the front fairing panel 42 at a location above the air inflow opening 47 and the air inflow opening 47 and the lamp opening 54 altogether form a single continuous opening 47.

Figure 4B:
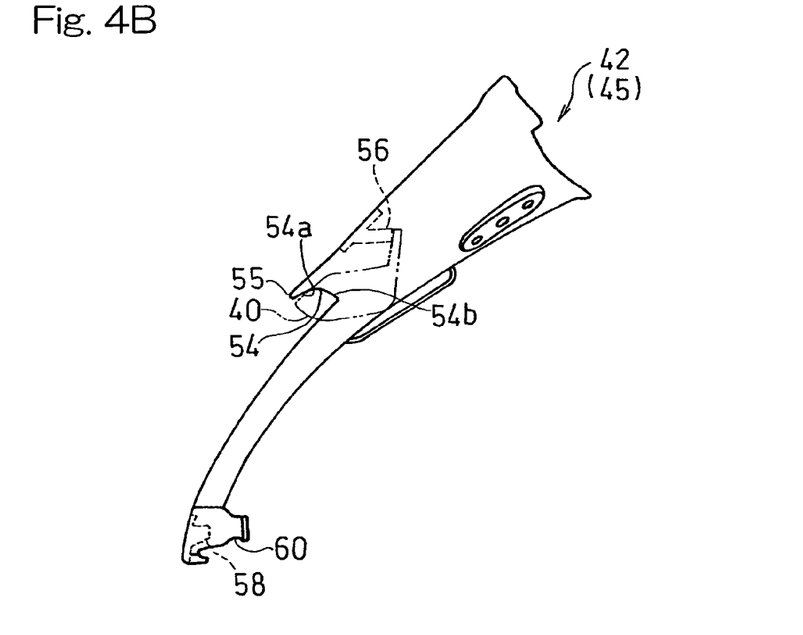
FIG. 4B is a side view of the fairing shown in FIG. 4A.

A side protuberance 57 for partitioning between the air inflow opening 47 and the lamp opening 54 is formed between the air inflow opening 47 and the lamp opening 54. As best shown in FIG. 4B, the lamp opening 54 is inclined to be directed forwardly and downwardly. In other words, the lamp opening 54 has an upper wall 54a that is formed integrally with a protuberance 55 protruding forwards beyond a front ends of opposite side walls 54b and 54b, with the light emitting surface of the position lamp 40 arranged at this protuberance 55 in a lower face thereof. As can readily be understood from FIG. 6, the protuberance 55 represents a generally triangular shape protruding forwards from opposite side portions 55b towards a center potion 55a with respect to the direction widthwise of the motorcycle.

As best shown in FIG. 4A, a first boss 56 protruding rearwardly is formed at a location above the lamp opening 54. Although in the illustrated embodiment the first boss 56 is employed two in number, one or three or more bosses may be employed. A second boss 58 protruding rearwards is also formed at a location below the air inflow opening 47. A pair of mounting pieces 60 extending in directions leftwards and rightwards with respect to the motorcycle are formed on respective sides of the second boss 58. Each of the mounting pieces 60 is formed with a throughhole 60a defined therein so as to be oriented in a direction conforming to the forward and rearward direction, that is, the longitudinal direction of the motorcycle.

Figure 5A:
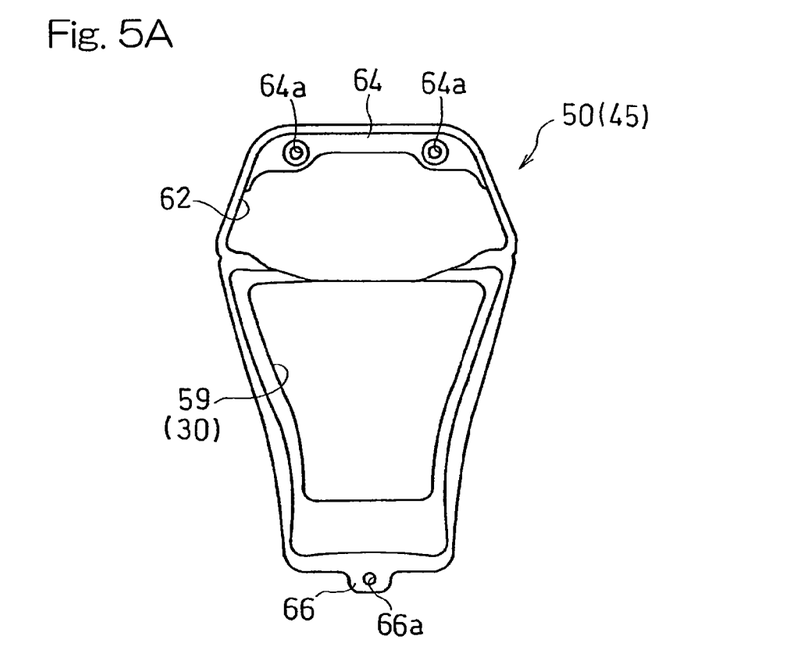
FIG. 5A is a front elevational view showing a center ram member employed in the motorcycle shown in FIG. 1.
Figure 5B:
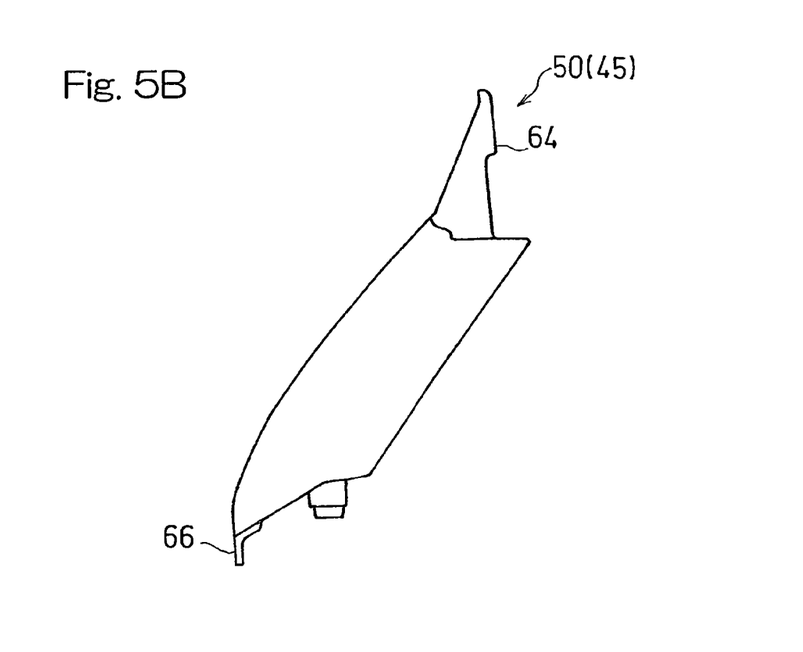
FIG. 5B is a side view of the center ram member shown in FIG. 5A.

As shown in FIG. 5A, a lamp accommodating opening 62 for holding the position lamp 40 is formed in an upper portion of the center ram member 50 and a ram opening 59 forming a rear half of the air inlet 30 is formed in a lower portion of the center ram member 50. A mounting flange 64 is formed above the lamp accommodating opening 62 and first bolt insertion holes 64a are formed in respective portions of the mounting flange 64 which are alignable with the first bosses 56 (best shown in FIG. 4A) of the front fairing panel 42. As shown in FIG. 5B, a support tab 66 is formed in a lower end of a front portion of the center ram member 50 so as to extend downwardly thereof and a second bolt insertion hole 66a best shown in FIG. 5A is provided at a portion of the support piece 66, which is alignable with the second boss 58 (best shown in FIG. 4A) of the front fairing panel 42.

As best shown in FIG. 3, the position lamp 40 includes a light emitting element 68, a casing 70 overlaying respective areas above and rearwardly of the light emitting element 68 and supporting the light emitting element 68, and a covering 72 for overlaying respective areas forwardly and downwardly of the light emitting element 68. In the illustrated embodiment, the light emitting element 68 is employed in the form of a light emitting diode (hereinafter referred to as LED for short) and the LED 68 is supported by the casing 70 through a substrate 69 having a circuit for energizing the LED 68 to emit rays of light. The substrate 69 referred to above supports a lens 71 coupled therewith for directing the rays of light, emitted from the LED 68, in forward and downward directions. It is, however, to be noted that the light emitting element may not necessarily be limited to the LED 68. The substrate 69 is arranged in the vicinity of the air inflow opening 47 readily accessible to the incoming wind A so that areas of the substrate 69, which involve heat emission, can be positively cooled by the incoming wind A to thereby suppress an undesirable increase of the temperature of those heat emitting areas.

Figure 6:
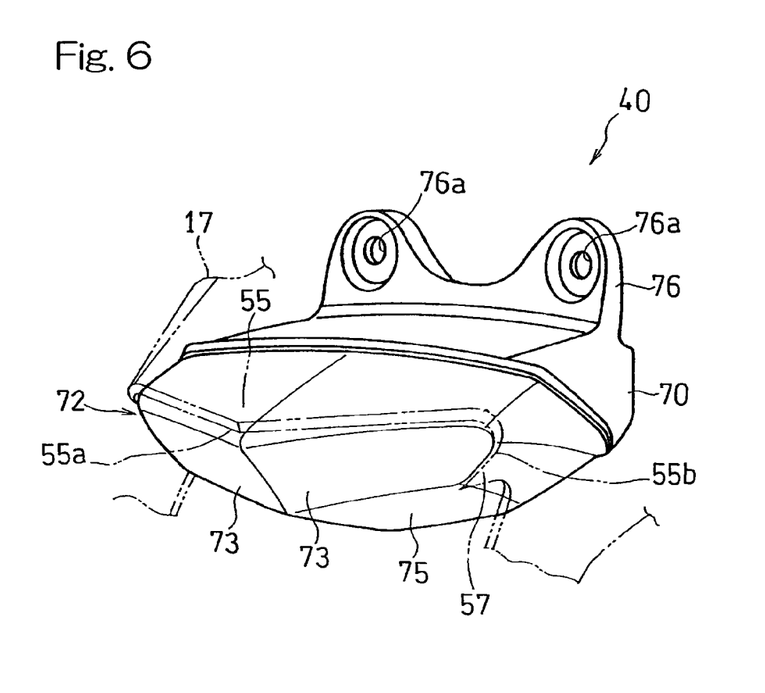
FIG. 6 is a perspective view showing a position lamp employed in the motorcycle shown in FIG. 1.

The casing 70 is made of resin and has its rear wall formed with a cable introducing portion 70a through which a cable 74 for the LED 68 is introduced. Also, the casing 70 has a flanged portion 76 extending upwardly from a rear end of an upper wall thereof and bolt insertion holes 76a best shown in FIG. 6 is formed in that flanged portion 76.

The covering 72 referred to above is made of a transparent resin and forms the light emitting surface of the position lamp 40. More specifically, the light emitting surface is formed by a front face 73, which is an outer face of a front wall 72a of the covering 72 shown in FIG. 3, and a lower face 75, which is an outer face of a lower wall 72b or an extension face continued to a rear side of the front face 73. Since emitted light from the lens 71 does not travel towards an upper face and side faces of the covering 72, they do not form any part of the light emitting surface. The front face 73 is so inclined backwardly from front to rear as to converge substantially or generally at a center of the air inflow opening 47, that is, diagonally inwardly and downwardly. Also, the front face 73 is, as best shown in FIG. 6, so inclined as to protrude forwards towards a point intermediate of the widthwise direction of the motorcycle.

Figure 7:
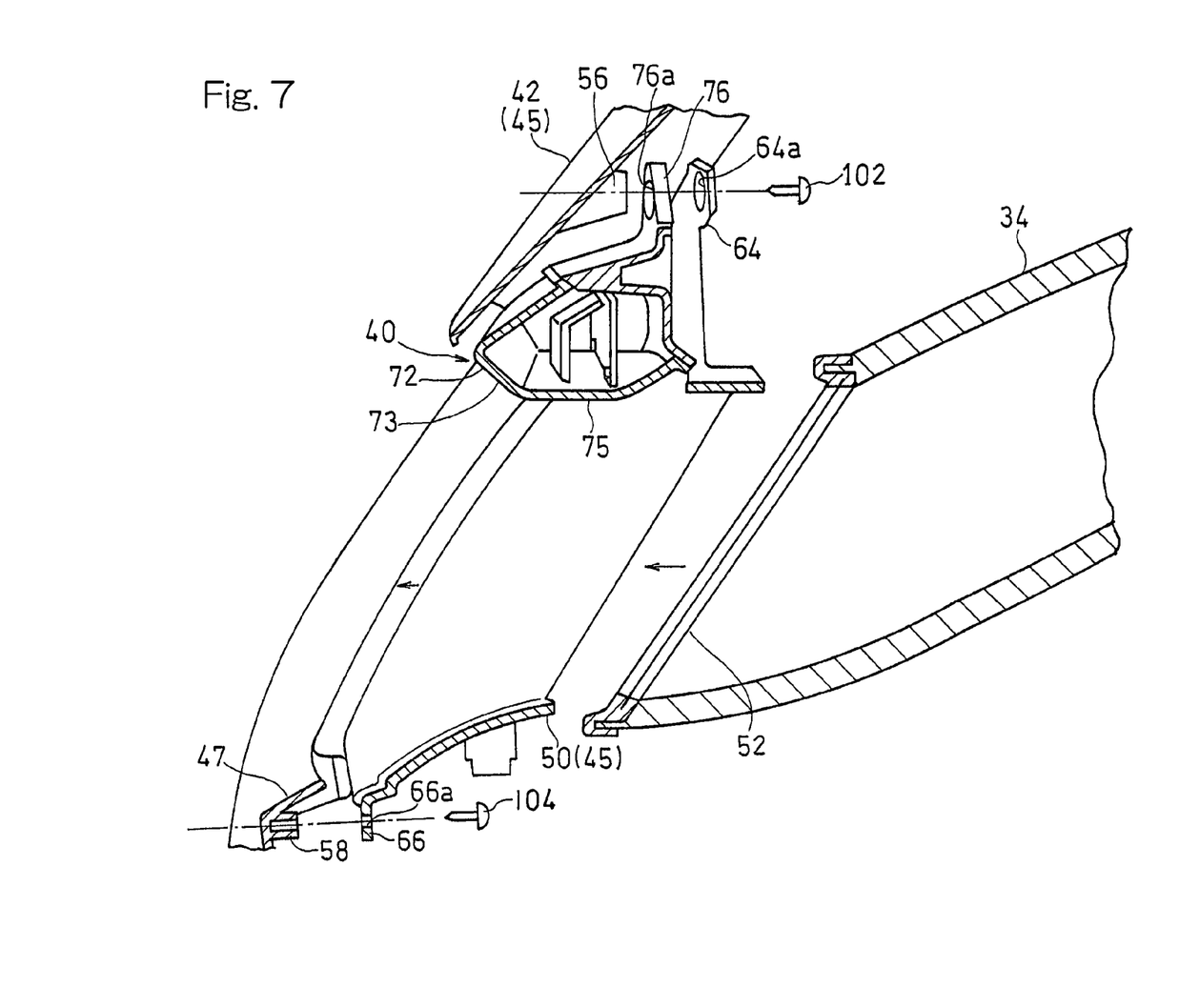
FIG. 7 is an exploded view showing the fairing, the position lamp and a ram duct, all employed in the motorcycle shown in FIG. 1.

Referring now to FIG. 7, the manner of assembling the position lamp 40, the front fairing panel 42 and the center ram member 50 will be described in detail. In the first place, in a condition in which the position lamp 40 is disposed in the lamp accommodating opening 62 (best shown in FIG. 5A) in the center ram member 50 so that the covering 72 of the position lamp 40 may align with the lamp opening 54 (best shown in FIG. 4A) in the front fairing panel 42. Fastening members 102 such as, for example, tapping screws are inserted through the first bolt insertion holes 64a in the center ram member 50 and the bolt insertion holes 76a in the position lamp 40 and are then threaded into the first bosses 56 of the front fairing panel 42 shown in FIG. 4A, thereby allowing the position lamp 40 to be supported in the form as sandwiched between the front fairing panel 42 and the center ram member 50, as shown in FIG. 7.

Then, a fastening member 104 such as, for example, a tapping screw is, after having been passed through the second bolt insertion hole 66a in the center ram member 50, threaded into the second boss 58 in the front fairing panel 42 to connect the front fairing panel 42 and the lower portion of the center ram member 50 together to thereby form the cowl member 45. In this way, the position lamp 40, the front fairing panel 42 and the center ram member 50 are thus connected together.

Thereafter, fastening members (not shown) are inserted through the respective throughholes 60a, which have been defined in the corresponding mounting pieces 60 on the opposite sides of the lower portion of the front fairing panel 42 as best shown in FIG. 4A, and are then threaded into threaded holes (not shown), which are formed in the left and right side fairing panels 44, to thereby connect the front fairing panel 42 and the side fairing panels 44 together. On the other hand, the windshield 46 is fitted to the front fairing panel 42 by means of screw members 100, thereby completing assemblage of the fairing 17 with the cowl member 45, made up of the front fairing panel 42 and the side fairing panels 44, and the center ram member 50.

Finally, the fairing 17 is fitted to the main frame substructure 1 shown in FIG. 1. At this time, as shown in FIG. 3, the screen unit 52 is held in position between the rear end portion of the center ram member 50 and the ram duct 34.

In the embodiment as hereinbefore described, the front fairing panel 42 and the center ram member 50 are constituted by respective members separate from each other. If the front fairing panel and the center ram member are of a unitary structure, the position lamp need be arranged in a narrow space within the opening in the front fairing panel, but the use of the separate members for the front fairing panel 42 and the center ram member 50 is effective to allow the position lamp 40 to be secured to one of the front fairing panel 42 and the center ram member 50 or the both at a large working space, thus facilitating the assemblage of the position lamp 40.

Also, the front fairing panel 42, which is exposed to the outside, and the center ram member 50, which is not exposed to the outside, are molded with the use of coloring materials of different colors and hence, their outer surfaces have different colors. The front fairing panel 42 and the center ram member 50 may be painted with different colors so as to form the outer surfaces thereof in different colors. Since as described hereinbefore, the front fairing panel 42 and the center ram member 50 are made using members separate from each other, the front fairing panel 42 and the center ram member 50 can be easily formed in different colors. Where the front fairing panel and the center ram member are integrally formed into a unitary member, to make them formed in different colors requires separate paintings to such unitary member, lowering workability.

The position lamp 40 is colored in a color similar to the color of the center ram member 50. More specifically, the covering 72 is formed transparent and the casing 70 is formed in a color similar to that of the center ram member 50. Accordingly, it is possible to avoid the possibility that during the lights-out time, light emitting surfaces 73 and 75 may become conspicuous. In order to avoid the possibility that the light emitting surfaces 73 and 75 may become conspicuous, the center ram member 50 is preferably colored in a black color or a color similar to the black color. Also, the light emitting surfaces 73 and 75 themselves may be molded with the use of respective coloring materials of colors similar to each other. By so doing, it is possible to avoid the position lamp 40 becoming conspicuous. Yet, since the position lamp 40 employs the light emitting element 68 in the form of an LED, compactization is possible as compared with an incandescent lamp. By so doing, it is highly possible to avoid the possibility that the position lamp 40 may become conspicuous.

In the construction hereinbefore described, since the light emitting surfaces 73 and 75 of the position lamp 40 best shown in FIG. 3 are arranged in the inner peripheral surface 31 of the air inlet 30 where light from the outside will hardly reach, it is possible to prevent the existence of the position lamp 40 from becoming conspicuous in a condition with the position lamp 40 turned off. As a result, the appearance of the motorcycle can be improved. Also, since the position lamp 40 is arranged in the air inlet 30 for introducing the air therethrough towards the combustion engine E, there is no need to employ any extra opening. In addition, since the air inlet 30 is made open forwards, a required range of forward lighting and a required amount of forward light distribution can be secured when the position lamp 40 is turned on. Accordingly, the visibility of the position lamp 40 increases.

Further, since the position lamp 40 is arranged above the inner peripheral surface 31 where light will hardly reach from above, it is highly possible to prevent the position lamp 40, then turned off, from becoming conspicuous. Also, since as compared with the case in which the position lamp 40 is arranged in the inner peripheral face below, the position lamp 40 is turned on at a high position, the visibility of the position lamp 40 increases when and so long as the position lamp 40 is turned on.

Also, since the front face 73 of the covering 72 of the position lamp 40 is inclined from front to rear so as to converge at a point downwardly thereof, not only can the front face 73, which is the light emitting surface, be suppressed from becoming conspicuous when viewed from front, but also the surface area of the front face 73 or the light emitting surface is increased to enable the required amount of forward lighting to be secured, thereby increasing the visibility of the position lamp 40. In addition, the inclination of the front face 73 functions as a guide for guiding the incoming wind A towards the air inlet 30.

Since the light emitting surface 73 of the covering 72 of the position lamp 40 is arranged at the protuberance 55 protruding forwards from the front ends of the opposite side walls 54b and 54b best shown in FIG. 4, the light will not be intercepted by the opposite side walls 54b and 54b during the lighting of the lamp so that the amount of light directed towards opposite sides of the motorcycle can be increased. As a result, the visibility of the position lamp 40 from lateral sides increases.

Since as clearly shown in FIG. 6, the front face 73 of the covering 72 of the position lamp 40 is so inclined as to protrude forwards towards the vehicle widthwise intermediate portion, the light from the front face 73 of the covering 72 of the position lamp 40 can be directed not only in the forward direction, but also in directions sidewise of the motorcycle and, therefore, the visibility of the position lamp 40 from the lateral direction is further increased.

Also, since the light is emitted outwardly from the lower face 75 continued from the rear side of the front face 73 of the covering 72 of the position lamp 40 best shown in FIG. 3, the light emitted from the lower face 75 is reflected by the lower region 31c of the inner peripheral surface 31 of the air inlet 30 opposed to the lower face 75 of the covering 72 and, therefore, such reflecting face forms a part of the light emitting region, wherefore the light emitting region increases to allow the visibility of the position lamp 40 to further increase.

Furthermore, since the front fairing panel 42, which is exposed to the outside, and the center ram member 50, which forms a part of the air induction passage 35, are constructed with the use of separate members and the position lamp 40 is arranged between the front fairing panel 42 and the center ram member 50, the front fairing panel 42 and the center ram member 50 are separated so that the position lamp 40 can be secured to one of the front fairing panel 42 and the center ram member 50 or the both at a large working space, thus facilitating the assemblage of the position lamp 40.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the preferred embodiment, the position lamp has been shown and described as arranged in the inner peripheral face of the air inlet, the position lamp may not be necessarily arranged in that part of the air inlet, but may be arranged in any suitable opening provided that such opening is defined by depressing rearwardly from the fairing surface so as to open forwards. Also, the lamp fitted to the inner peripheral face of the opening may be any suitable lamp other than the position lamp.

In addition, the present invention can be equally applied to any other vehicles than the motorcycle, such as, for example, a buggy, a four wheeled vehicle and a small planing boat.

Accordingly, such changes and modifications are, unless they depart from the scope of the present invention as delivered from the claims annexed hereto, to be construed as included therein.

REFERENCE NUMERALS

17 . . . Fairing
30 . . . Air inlet
35 . . . Air induction passage
40 . . . Position lamp (Lamp)
42 . . . Front fairing panel
50 . . . Center ram member
55 . . . Protuberance
72 . . . Covering
73 . . . Front face of the covering (Light emitting surface)
75 . . . Lower face of the covering (Light emitting surface)
A . . . Incoming wind
E . . . Combustion engine

What is claimed is:

1. A lamp arrangement for a motorcycle, which comprises:
   a fairing to cover a front portion of a motorcycle frame structure above a front wheel, the fairing being formed with an air inflow opening to open at a forward location on the motorcycle, the air inflow opening is communicated with an air inlet for introducing an intake air through an air induction passageway towards a combustion engine; and
   a position lamp is mounted on the fairing, for providing an indication of the presence of the motorcycle, the position lamp including a light emitting element and a covering to overlay an area forwardly of the light emitting element, the covering forming a light emitting surface of the position lamp and also directs the intake air into the air induction passageway towards the combustion engine,
   in which the position lamp is arranged on an inner peripheral surface of the air inlet, with the light emitting surface exposed from at least one region of an upper region, a lower region and a side region of the inner peripheral surface, to direct the air flow contacting the covering.

2. The lamp arrangement for the motorcycle as claimed in claim 1, in which the light emitting surface has a front face to face forward, the front face being inclined from front to rear so as to converge at a center of the air inlet.

3. The lamp arrangement for the motorcycle as claimed in claim 1 in which the light emitting surface is arranged in an upper region of the inner peripheral surface of the air inlet.

4. The lamp arrangement for the motorcycle as claimed in claim 3, in which the air inlet has an upper wall and opposite side walls, the upper wall having a protuberance protruding forwards beyond front ends of opposite side walls of the air inlet, and the light emitting surface is arranged in a lower face of this protuberance.

5. The lamp arrangement for the motorcycle as claimed in claim 3, in which the light emitting surface has a front face to face forward, the front face being inclined towards a point intermediate of a widthwise direction of the motorcycle so as to protrude forwards.

6. The lamp arrangement for the motorcycle as claimed in claim 1, in which the light emitting surface has a front face to face forward and an extension face continued from a rear side of the front face, to confront a center of the air inlet.

7. The lamp arrangement for the motorcycle as claimed in claim 1, further comprising a cowl member, forming a part of the fairing, and a center ram member disposed rearwardly of the fairing to form a part of an air induction passage to connect with the air inlet and the light emitting surface is arranged between the fairing and the center ram member.

8. The lamp arrangement for the motorcycle as claimed in claim 7, in which the fairing and the center ram member have outer surfaces colored in different colors.

9. A motorcycle equipped with the lamp arrangement as defined in claim 1.

10. The lamp arrangement for the motorcycle as claimed in claim 1, in which the light emitting surface is arranged between left and right head lamp units.

11. The lamp arrangement for the motorcycle as claimed in claim 1, in which the light emitting surface is of a configuration elongated in a width direction of the motorcycle.

12. The lamp arrangement for the motorcycle as claimed in claim 1, in which the position lamp has the light emitting element in the form of a light emitting diode.

13. The lamp arrangement for the motorcycle as claimed in claim 1, in which the air inflow is positioned at a center portion of the motorcycle in a widthwise direction.

14. The lamp arrangement for the motorcycle as claimed in claim 1, in which a heat generating portion of the light emitting element is arranged in the vicinity of the air inflow opening to enable heat dissipation from the light emitting element.

15. The lamp arrangement for the motorcycle as claimed in claim 3, in which the light emitting surface has a front face to face forward, the front face being inclined gradually downwardly toward a backward direction.

16. A position lamp arrangement for a motorcycle comprising:
   a fairing to cover a front portion above a front wheel of the motorcycle, the fairing having an opening in which a lower portion of the opening provides an air intake opening for introducing an intake air through an air induction passageway towards a motorcycle engine and an upper portion of the air intake opening is configured to mount a lamp; and a position lamp, including a housing with light emitting element and a light emitting surface, the housing is mounted in an upper portion of the air intake opening in the fairing for projecting light downward and to the sides of the fairing to illuminate exterior portions of the motorcycle, wherein the housing extends through the fairing to form a part of the air induction passageway to introduce the intake air towards the motorcycle engine.

* * * * *